United States Patent
Menzel

(10) Patent No.: US 7,699,908 B2
(45) Date of Patent: Apr. 20, 2010

(54) METHOD FOR DISPLACING ACID GAS CONSTITUENTS INSIDE A NATURAL GAS NETWORK

(75) Inventor: Johannes Menzel, Waltrop (DE)

(73) Assignee: UHDE GmbH, Dortmund (DE)

( * ) Notice: Subject to any disclaimer, the term of this patent is extended or adjusted under 35 U.S.C. 154(b) by 626 days.

(21) Appl. No.: 10/580,799

(22) PCT Filed: Nov. 27, 2004

(86) PCT No.: PCT/EP2004/013491
§ 371 (c)(1),
(2), (4) Date: Feb. 9, 2007

(87) PCT Pub. No.: WO2005/054412
PCT Pub. Date: Jun. 16, 2005

(65) Prior Publication Data
US 2007/0227355 A1 Oct. 4, 2007

(30) Foreign Application Priority Data
Dec. 5, 2003 (DE) ................ 103 57 324

(51) Int. Cl.
*C10L 3/10* (2006.01)
*B01D 53/14* (2006.01)
(52) U.S. Cl. .............. 95/159; 95/172; 95/235; 423/220; 208/208 R
(58) Field of Classification Search .......... 95/159, 95/169, 172, 177, 235, 263, 266; 423/220, 423/226–229, 242.1; 208/208 R, 236; 585/800, 585/802, 833, 834
See application file for complete search history.

(56) References Cited

U.S. PATENT DOCUMENTS

| | | | |
|---|---|---|---|
| 4,093,029 A * | 6/1978 | Weisz et al. | 166/305.1 |
| 4,382,912 A * | 5/1983 | Madgavkar et al. | 423/224 |
| 4,395,385 A | 7/1983 | Welsh | |
| 4,405,593 A * | 9/1983 | Schlauer et al. | 423/574.1 |
| 4,548,620 A * | 10/1985 | Albiol | 95/174 |
| 4,824,452 A | 4/1989 | Gruenewald et al. | |
| 4,976,935 A * | 12/1990 | Lynn | 423/222 |
| 6,102,987 A | 8/2000 | Gross et al. | |
| 6,139,605 A * | 10/2000 | Carnell et al. | 95/164 |
| 6,666,908 B2 * | 12/2003 | Cadours et al. | 95/166 |
| 2006/0067875 A1 | 3/2006 | Koss et al. | |

FOREIGN PATENT DOCUMENTS

| | | |
|---|---|---|
| DE | 102 19 900 A1 | 11/2003 |
| EP | 0 279 494 B1 | 5/1993 |
| EP | 0 920 901 B1 | 6/1999 |

* cited by examiner

*Primary Examiner*—Frank M Lawrence
(74) *Attorney, Agent, or Firm*—Marshall & Melhorn, LLC

(57) ABSTRACT

A method for displacing acid gas constituents from natural gas to acid gas removal installations equipped with Claus installations with free capacities utilizes a portion of the acid gas which is removed from a first flow of natural gas containing acid gas. The acid gas removed from the first flow of natural gas is fed to at least one other acid gas removal installation, whereby this feeding results in the acid gas removed from the first flow of natural gas being mixed with at least one second flow of natural gas with which it is transported to at least one other acid gas removal installation.

14 Claims, 1 Drawing Sheet

METHOD FOR DISPLACING ACID GAS CONSTITUENTS INSIDE A NATURAL GAS NETWORK

BACKGROUND OF THE INVENTION

The invention relates to a process for shifting sour gas portions within a natural gas network. The process can be used for natural gas types that contain not only useful substances, such as methane, higher hydrocarbons, hydrogen and carbon monoxide impurities, such as hydrogen sulphide, organic sulphur components, e.g. mercaptanes, and carbon oxysulphide, but also carbon dioxide and water vapour in different portions.

As a rule, the sulphur components contained in the raw natural gas have to be removed to obtain a residual content of only a few ppm to permit further industrial utilization of the natural gas. The removal of hydrogen sulphide, mercaptanes, carbon dioxide and other sour gas constituents from industrial gases is generally performed with the aid of chemically acting absorbents, such as amino solutions, alkali salt solutions, etc. or physically acting, chemically non-active absorbents, such as Selexol, propylene carbonate, N-methyl pyrrolidone, Morphysorb, methanol, etc. in loop systems, the physically acting absorbents (as opposed to chemical scrubbing agents) being capable of removing organic sulphur components. In this process, the carbon dioxide contained in the gas is removed partially, totally or only in a portion as little as possible, depending on the requirements and specifications.

Normally, the sour gas from the absorbent regeneration unit is further processed to sulphur in a Claus plant. In this connection, the separation capacity of the sour gas absorption unit and the related processing capacity of the Claus plant impose restrictions on the quantity of sour gas that can be absorbed from the natural gas and this consequently also applies to the throughput of natural gas that can be purified by absorption.

Plants of this type exist in large numbers and at various locations. It is often a problem that the sour gas content varies during the exploitation of natural gas resources, in particular that the said content increases. Any increase in the sour gas content of the natural gas at the same rate of exploitation would thus lead to an overload of the sour gas separation unit and of the Claus plant as well. Hence, the natural gas production rate would have to be decreased or the existing plants would have to be retrofitted with the necessary, expensive equipment, so that the respective other plant simultaneously would have free capacities in the event of smaller sour gas portions or lower production rates.

There has been a keen interest for a long time already in finding an efficient facility for the shifting of sour gas contained in natural gas from the overloaded sour gas separation units and related Claus plant to such separation units with Claus plant that have free capacities in order to operate all units involved at their maximum natural gas capacity.

The aim of the invention, therefore, is to provide a process that permits a simple and efficient shifting of sour gas portions in the natural gas to such sour gas separation units with Claus plant that have free/free capacities.

BRIEF SUMMARY OF THE INVENTION

The invention solves the problem described by the following steps:
  a portion of sour gas is removed from the first natural gas stream that contains sour gas;
  the sour gas portion removed from the first natural gas stream is shifted to at least one additional sour gas separation unit;
  the feed operation to the further sour gas separation unit is effected in such a manner that the sour gas removed from the first natural gas stream is mixed to at least one second natural gas stream and that this mixture is piped to the further sour gas separation unit.

DETAILED DESCRIPTION OF THE INVENTION

Figure 1:
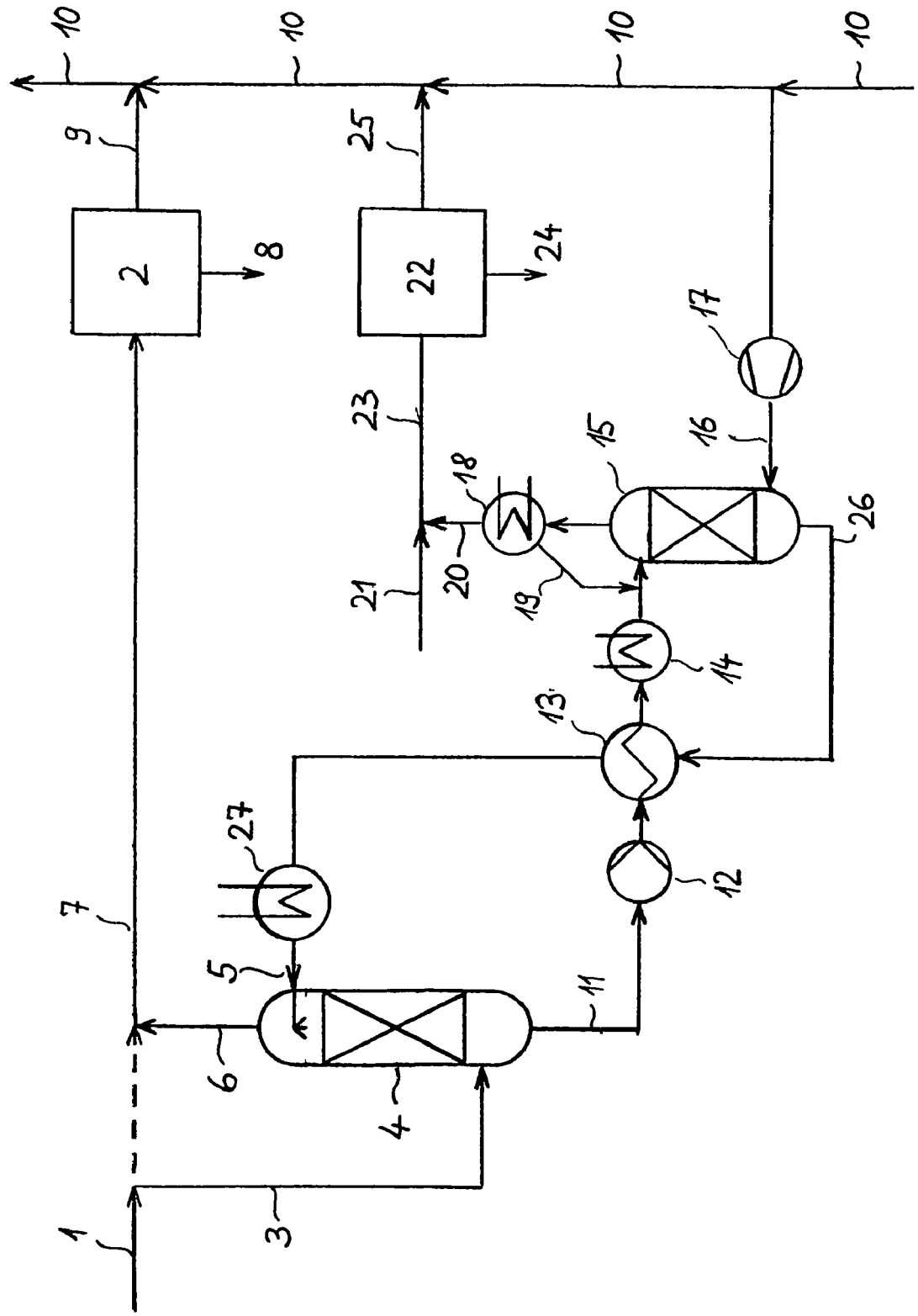
FIG. 1 shows an embodiment of the process of the present invention.

On the one hand, this method has the advantage that the separation of the sour gas from the first natural gas stream can be varied in such a way that the downstream sour gas separation unit with Claus plant, in which the separation and treatment of the sulphur components take place, is adjustable to obtain the maximum throughput so that this section always operates at its rated capacity. In this context the term "rated capacity" is understood to mean the max. gas throughput possible and the max. admissible sour gas treatment capacity. On the other hand there is a major advantage to the effect that no new feed piping is required because the natural gas pipelines feeding the existing sour gas treatment plants is already available in situ.

The second natural gas stream mixed with the sour gas removed before may be either a natural gas stream already purified or a non-purified natural gas stream. What matters is that the said stream conveys the sour-gas-bearing natural gas to one or several downstream sour gas separation unit(s) with Claus plant that has/have free capacities for sour gas processing.

The separation of the sour gas from the first natural gas stream always takes place in portions in accordance with the present invention. The separation of sour gas in portions is an essential feature of this invention and on the one hand, it is understood to mean that no purity grade whatsoever is required for the residual sour gas content. On the other hand, the portion separated in accordance with the invention is defined, selectable and adjustable, i.e. the very portion to be shifted, and this shift also is variable in time depending on the percentage of exploitation of the sour gas separation unit and the related Claus plant. Any separation facility that provides for a separation of the whole or almost the whole sour gas content does not satisfy the criterion of a separation in portions according to the present invention.

In an embodiment of the process in accordance with the present invention, the separation of the sour gas contained in the first natural gas stream is effected by absorption as follows:
  The sour gas portion to be separated is removed from the first natural gas stream, using a chemically non-active adsorbent;
  the laden absorbent is recycled to the head of a desorption unit;
  the sour gas desorbed by and leaving the desorption unit is admixed to a second natural gas stream.

In a further embodiment of the process in accordance with the present invention, a natural gas stream that is at least partly purified is fed as stripping gas to the bottom of the desorption unit, the stripping gas and the desorbed sour gas being jointly admixed to the second natural gas stream and the desorption unit being designed as stripping column. In this case, the desorption unit can be operated at a pressure level that permits the mixture of desorbed sour gas and stripping gas to be added without compression to the natural gas stream, which is piped to the sour gas separation unit with a free capacity for sour gas separation. It is recommendable that the laden adsorbent also be heated prior to being fed to the desorption unit.

In an optional embodiment of the process in accordance with the present invention, the laden absorbent is flashed in the desorption unit which in this particular case would be designed as flash vessel. In this case, the flash vessel can be operated at a pressure level that permits the flashed sour gas to be added without compression to the natural gas stream which is piped to the sour gas separation unit with a free capacity for sour gas separation, the laden adsorbent being heated prior to entering the flash vessel.

As a rule, sour gases desorbed with the aid of chemically non-active adsorbents still contain valuable components that were simultaneously separated from the natural gas and that must be recovered by expensive methods, e.g. by means flashing steps for recycle gas. This treatment step can be omitted because the valuable components co-separated by desorption are added to the natural gas stream used as stripping gas so that the said components are not lost, which constitutes a further advantage of the invention.

The low-level requirements for the regeneration of the adsorbent constitute a further advantage of the invention. It is common knowledge that the degree of purity specified for the natural gas to be cleaned determines the admissible content of residues in the absorbent after regeneration, because a balance of the residual content in the absorbent and that in the natural gas is built up in the head section of the absorption column if a chemically non-active absorbent is used. Another advantage of the invention is that a complete desorption of the adsorbent is not necessary if the residual content of sour gas components in the natural gas may be high as a result of the fact that the natural gas partly purified by the said method still undergoes a treatment in a downstream sour gas separation unit with Claus plant, and this section merely requires easing of the load.

According to an embodiment of the process implemented in line with the invention, the desorption column can be operated at a pressure level that permits the mixture of desorbed sour gas and stripping gas to be added without compression to the natural gas stream which is piped to the sour gas separation unit with a free capacity for sour gas separation. A further benefit of this method is the fact that the adaptation of the pressure level—in most cases an increase in pressure is involved—is feasible by means of a cheap pump which performs the delivery of the laden adsorbent and that a compressor would merely be required for adjusting the stripping gas pressure. An expensive sour gas compression unit is not required.

The process for shifting sour gas portions contained in a natural gas (1) from a first sour gas separation unit (2) to at least two or more further sour gas separation units (22) with free capacities in accordance with the invention as described herein, can also be operated when:
- the sour gas (20) removed from the first natural gas stream is fed to at least two or more further sour gas separation units, and
- the feed operation to the further sour gas separation units is effected in such a manner that the sour gas removed from the first natural gas stream (20) is mixed with at least two or more natural gas streams and that these mixtures are piped to the two or more further sour gas separation units.

The invention is described in more detail below with the aid of a process diagram illustrated in FIG. 1: FIG. 1 shows the process according to the present invention and consists of two sour gas separation units with Claus plant, a sour gas absorption unit with desorption and the routing of the main process streams; the process according to this invention not being limited to this particular configuration used as typical example.

As the sour gas content of natural gas stream 1 exceeds the capacity of the related sour gas separation unit with Claus plant 2, part stream 3 is withdrawn and fed to the bottom of absorption column 4. The natural gas ascending in absorption column 4 is freed from the sour gas with the aid of chemically non-active absorbent 5 and leaves the head of absorption column 4. Natural gas 6 thus freed can subsequently be remixed with first natural gas stream 1.

The withdrawal of part stream 3 and the admixture of the freed natural gas 6 may take place in the same section, a fact illustrated by the dashed line in the diagram. It is also possible to send the complete first natural gas stream 1 into the absorption column so that the withdrawal of a part stream and the re-admixture of the latter can be omitted. The crucial criterion is that natural gas 7 thus obtained matches to the extent possible the rated capacity of sour gas separation unit with Claus plant 2, a plant section that ensures that the sour gas is converted to sulphur 8 and that purified natural gas 9 is fed to product natural gas pipeline 10.

When the natural gas undergoes a reduction of the sour gas content in absorption column 4, it is logical that the absorbent becomes laden with sour gas and absorbed material 11 is removed from the column bottom. Pressurisation pump 12 is used to adjust the pressure level in such a manner that a downstream sour gas compressor is not required. The absorbed material is subsequently heated up in heat exchanger 13 and heater 14 and then fed to the head of desorption column 15.

A minor stream of product natural gas 16, which if required is pressurised to the respective pressure level by means of natural gas compressor 17, is sent to desorption column 15. As the absorbed material is heated up, a major part of the absorbed sour gas undergoes desorption and is released at the head together with the stripping gas. The downstream absorbent condenser 18 is used to separate by condensation and recycle the entrained absorbent, in the example shown here as condensate return 19 directly upstream of desorption column 15, and it would also be possible to return the condensate directly to heater 14.

Mixture 20 of the sour gas and natural gas is admixed to a second natural gas stream 21 the sour gas content of which does not reach the capacity of the related sour gas separation unit with Claus plant 22. This mode shifts a minor concentrated sour gas stream into natural gas line 23, which merely causes a very slight increase in the total stream volume in this line. Hence, the conveying capacity of natural gas line 23 as well as the processing capacity of the sour gas separation unit with Claus plant 22 are better exploited. The sour gas separation unit with Claus plant 22 ensures that the sour gas is converted to sulphur 24 and that purified natural gas 25 is fed to product natural gas pipeline 10.

Absorbent 26 regenerated in desorption column 15 is withdrawn from the column bottom and sent through heat exchanger 13 and subsequently cooler 27 to obtain the specified input temperature.

The benefits of this invention are also substantiated by the following calculation example: Two different sour gas separation units are fed with input gas via the respective raw gas line. Sour gas separation unit with Claus plant 2 can process 80 000 Nm$^3$/h with max. 4% by volume H$_2$S. Sour gas separation unit with Claus plant 22 is rated for a feed of 110 000 Nm$^3$/h and up to 12% by volume H$_2$S. H$_2$S portion of the raw gas for sour gas separation unit with Claus plant 2 now rises to 6.47% by volume whereas the H$_2$S portion of the raw gas for sour gas separation unit with Claus plant 22 is approx. 9.3% by volume. If no shifting system were used, sour gas separation unit with Claus plant 2 would have to be controlled to the effect of lowering the raw gas throughput to 48 000 Nm$^3$/h, i.e. to 60% of its nominal capacity, hence causing a production loss of 40%.

The procedure in accordance with this invention is now feasible on a cost-efficient basis because the excess sour gas coming from the sour gas separation unit with Claus plant 2 can be shifted to sour gas separation unit with Claus plant 22. The sour gas content is thus re-adjusted to 4% by volume in sour gas separation unit with Claus plant 2 so that the complete plant section is again exploitable at 100% of the rated capacity. The H$_2$S content in sour gas separation unit with Claus plant 2 thus rises from 9.3% by volume to 10.8%, the rated throughput to 101.9%. When referring the throughputs to the overall product gas stream of both plants, it becomes obvious that the procedure implemented in compliance with the invention permits a product gas quantity of approx. 176 000 Nm$^3$/h compared to 147 000 Nm$^3$/h obtained without the new method, which corresponds to an increase in the production output by approx. 20%. If the H$_2$S content sent to the sour gas separation unit with Claus plant 2 is further lowered, e.g. to 3%, it is even possible to further increase the gas capacity to the sour gas separation unit with Claus plant 2, by approx. 33%, i.e. to 107.000 Nm$^3$, provided the said plant section can hydraulically cope with this additional quantity.

The following table reveals the calculation example involved, the figures corresponding to those in FIG. 1:

| Stream | Natural gas with H2S [kmol/h] | H$_2$S [kmol/h] | Absorbent [kmol/h] |
|---|---|---|---|
| 1 (= 3) | 3569.3 | 230.8 | — |
| 5 | — | 4.4 | 268.2 |
| 6 (= 7) | 3466.4 | 139.5 | — |
| 9 | 3326.9 | (4 ppm V) | — |
| 10 | 7839.9 | (4 ppm V) | — |
| 11 | — | 95.7 | 371.2 |
| 16 | 49 | (4 ppm V) | — |
| 20 | 152.9 | 91.3 | — |
| 21 | 4907.8 | 456.4 | — |
| 23 | 5060.7 | 547.7 | — |
| 25 | 4513 | (4 ppm V) | — |

| List of referenced designations | |
|---|---|
| 1 | First natural gas stream |
| 2 | Sour gas separation unit with Claus plant |
| 3 | Part stream |
| 4 | Absorption column |
| 5 | Absorbent |
| 6 | Natural gas with reduced sour gas content |
| 7 | Natural gas |
| 8 | Sulphur |
| 9 | Purified natural gas |
| 10 | Product natural gas pipeline |
| 11 | Absorbed material |
| 12 | Pressurisation pump |
| 13 | Heat exchanger |
| 14 | Heater |
| 15 | Desorption column |
| 16 | Product natural gas |
| 17 | Natural gas compressor |
| 18 | Absorbent condenser |
| 19 | Condensate return |
| 20 | Sour gas/natural gas mixture |
| 21 | Second natural gas stream |
| 22 | Sour gas separation unit with Claus plant |
| 23 | Natural gas pipeline |
| 24 | Sulphur |
| 25 | Purified natural gas |
| 26 | Absorbent |
| 27 | Cooler |

The invention claimed is:

1. Process for shifting sour gas portions contained in a natural gas (1) from a first sour gas separation unit (2) to a further sour gas separation unit (22) with free capacities, comprising:

a portion of sour gas is removed from a first natural gas stream (3) with a sour gas content, the sour gas (20) removed from the first natural gas stream is fed to a further sour gas separation unit (22), and the feed operation to the further sour gas separation unit (22) is effected in such a manner that the sour gas removed from the first natural gas stream (20) is mixed with at least one 2nd natural gas stream (21) and that this mixture is piped to the further sour gas separation unit (22).

2. Process for shifting sour gas separations contained in a natural gas (1) from a first sour gas separation unit (2) to a further sour gas separation unit (22) with free capacities in accordance with claim 1, wherein the removal of the sour gas contained in the first natural gas stream (3) is effected by absorption (4) as follows:

the sour gas portion to be separated is removed from the first natural gas stream (3), using a chemically non-active absorbent (5);

laden absorbent (11) is recycled to the head of a desorption unit (15);

the sour gas desorbed by the desorption unit (15) leaves this unit and is admixed to a second natural gas stream (21).

3. Process for shifting sour gas portions contained in a natural gas (1) from a first sour gas separation unit (2) to a further sour gas separation unit (22) with free capacities according to claim 2, wherein a natural gas stream (16) that is at least partly purified is fed as stripping gas to the bottom of the desorption unit (15), the stripping gas and the desorbed sour gas (20) being jointly admixed to the second natural gas stream (21) and the desorption unit (15) being designed as stripping column.

4. Process for shifting sour gas portions contained in a natural gas (1) from a first sour gas separation unit (2) to a further sour gas separation unit (22) with free capacities according to claim 3, wherein the desorption unit (15) can be operated at a pressure level that permits the mixture of desorbed sour gas and stripping gas (20) to be added without compression to natural gas stream (21) which is piped to the further sour gas separation unit (22) with a free capacity for sour gas separation.

5. Process for shifting sour gas portions contained in a natural gas (1) from a first sour gas separation unit (2) to a further sour gas separation unit (22) with free capacities according to claim 4, wherein laden absorbent (11) is heated prior to entering sour gas absorption unit (15).

6. Process for shifting sour gas portions contained in a natural gas (1) from a first sour gas separation unit (2) to a further sour gas separation unit (22) with free capacities according to claim 2, wherein laden absorbent (11) is flashed in desorption unit (15) which in this particular case would be designed as a flash vessel.

7. Process for shifting sour gas portions contained in a natural gas (1) from a first sour gas separation unit (2) to a further sour gas separation unit (22) with free capacities according to claim 6, wherein laden absorbent (11) is heated prior to entering desorption unit (15), desorption unit (15) being operated at a pressure level that permits flashed sour gas (20) to be added without compression to natural gas stream (21) which is piped to the further sour gas separation unit (22) with a free capacity for sour gas separation.

8. Process for shifting sour gas portions contained in a natural gas (1) from a first sour gas separation unit (2) to a further sour gas separation unit (22) with free capacities in accordance with claim 1, wherein:
   the sour gas (20) removed from the first natural gas stream is fed to at least two or more further sour gas separation units; and
   the feed operation to the further gas separation units is effected in such a manner that the sour gas removed from the first natural gas stream (20) is mixed with at least two or more natural gas streams and that these mixtures are piped to the two or more further gas separation units.

9. Process for shifting sour gas portions contained in a natural gas (1) from a first sour gas separation unit (2) to a further sour gas separation unit (22) with free capacities in accordance with claim 2, wherein:
   the sour gas (20) removed from the first natural gas stream is fed to at least two or more further sour gas separation units; and
   the feed operation to the further gas separation units is effected in such a manner that the sour gas removed from the first natural gas stream (20) is mixed with at least two or more natural gas streams and that these mixtures are piped to the two or more further gas separation units.

10. Process for shifting sour gas portions contained in a natural gas (1) from a first sour gas separation unit (2) to a further sour gas separation unit (22) with free capacities in accordance with claim 3, wherein:
    the sour gas (20) removed from the first natural gas stream is fed to at least two or more further sour gas separation units; and
    the feed operation to the further gas separation units is effected in such a manner that the sour gas removed from the first natural gas stream (20) is mixed with at least two or more natural gas streams and that these mixtures are piped to the two or more further gas separation units.

11. Process for shifting sour gas portions contained in a natural gas (1) from a first sour gas separation unit (2) to a further sour gas separation unit (22) with free capacities in accordance with claim 4, wherein:
    the sour gas (20) removed from the first natural gas stream is fed to at least two or more further sour gas separation units; and
    the feed operation to the further gas separation units is effected in such a manner that the sour gas removed from the first natural gas stream (20) is mixed with at least two or more natural gas streams and that these mixtures are piped to the two or more further gas separation units.

12. Process for shifting sour gas portions contained in a natural gas (1) from a first sour gas separation unit (2) to a further sour gas separation unit (22) with free capacities in accordance with claim 5, wherein:
    the sour gas (20) removed from the first natural gas stream is fed to at least two or more further sour gas separation units; and
    the feed operation to the further gas separation units is effected in such a manner that the sour gas removed from the first natural gas stream (20) is mixed with at least two or more natural gas streams and that these mixtures are piped to the two or more further gas separation units.

13. Process for shifting sour gas portions contained in a natural gas (1) from a first sour gas separation unit (2) to a further sour gas separation unit (22) with free capacities in accordance with claim 6, wherein:
    the sour gas (20) removed from the first natural gas stream is fed to at least two or more further sour gas separation units; and
    the feed operation to the further gas separation units is effected in such a manner that the sour gas removed from the first natural gas stream (20) is mixed with at least two or more natural gas streams and that these mixtures are piped to the two or more further gas separation units.

14. Process for shifting sour gas portions contained in a natural gas (1) from a first sour gas separation unit (2) to a further sour gas separation unit (22) with free capacities in accordance with claim 7, wherein:
    the sour gas (20) removed from the first natural gas stream is fed to at least two or more further sour gas separation units; and
    the feed operation to the further gas separation units is effected in such a manner that the sour gas removed from the first natural gas stream (20) is mixed with at least two or more natural gas streams and that these mixtures are piped to the two or more further gas separation units.

\* \* \* \* \*